May 12, 1959 R. K. STOLL ET AL 2,885,950
CONVERTIBLE GRILL
Filed Aug. 5, 1957 2 Sheets-Sheet 1

INVENTORS:
RALPH K. STOLL and
ARTHUR R. CHRISTENSEN
BY:
Bean, Brooks, Buckley & Bean,
ATTORNEYS.

May 12, 1959 R. K. STOLL ET AL 2,885,950
CONVERTIBLE GRILL
Filed Aug. 5, 1957 2 Sheets-Sheet 2
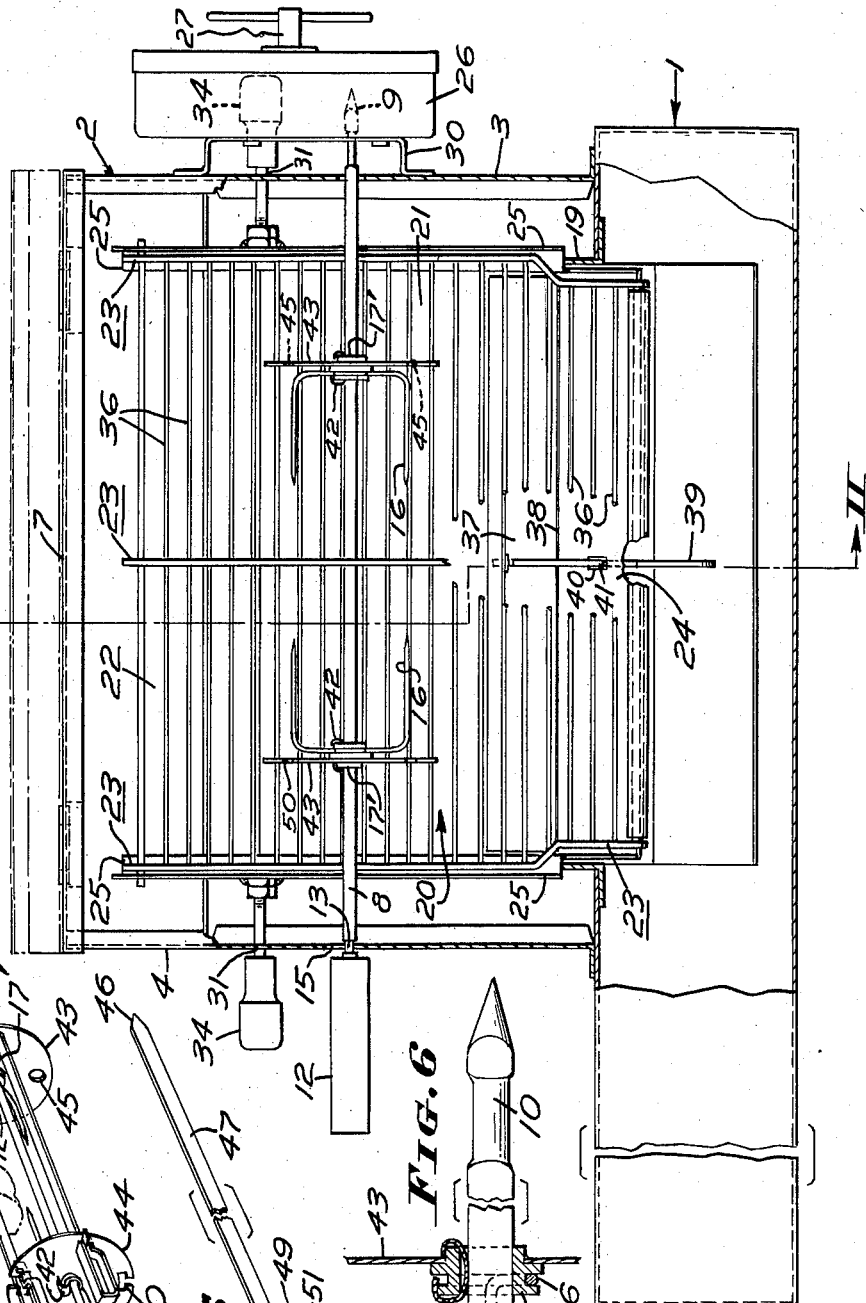
INVENTORS:
RALPH K. STOLL and
ARTHUR R. CHRISTENSEN
BY:
Beau, Brooke, Buckley & Beau,
ATTORNEYS.

United States Patent Office 2,885,950
Patented May 12, 1959

---

2,885,950

CONVERTIBLE GRILL

Ralph K. Stoll and Arthur R. Christensen, Lockport, N.Y., assignors to Niagara Instrument Corporation, Lockport, N.Y.

Application August 5, 1957, Serial No. 676,309

1 Claim. (Cl. 99—340)

This invention relates to a convertible grill and rotisserie and more particularly to a dual functioning food processing or cooking stove especially designed for use around the home and on picnics and outside uses.

The primary object of the invention is to provide a convertible apparatus of this nature which may be selectively adapted for either barbecuing or grilling by a simple shift of the firebed for securing the best advantage from the source of heat for the particular use.

The invention further resides in a simplified construction which readily adapts itself to picnicking and outdoor barbecuing and grilling use and embodies certain structural features which facilitate the conversion of the stove from one use to the other in a safe and practical manner.

Again, the invention has for an object to provide a novel and unique spit construction embodying independently removable skewers or sections especially designed for the preparation of shish-cabobs to properly support the cabobs and other food portions for thorough processing and to facilitate the serving of the broiled or roasted food.

The foregoing and other objects of the invention will manifest themselves as this description progresses, reference being made to the accompanying drawings, wherein—

Fig. 3 is a vertical but irregular sectional view taken about on line 3—3 of Fig. 2;

Fig. 4 is a perspective view of the improved spit with two of the skewers in position thereon;

Fig. 5 is a fragmentary perspective view of one of the improved skewers; and

Fig. 6 is a detail view of one of the supporting disks or plates for the skewers and impaling prongs.

Figure 2:
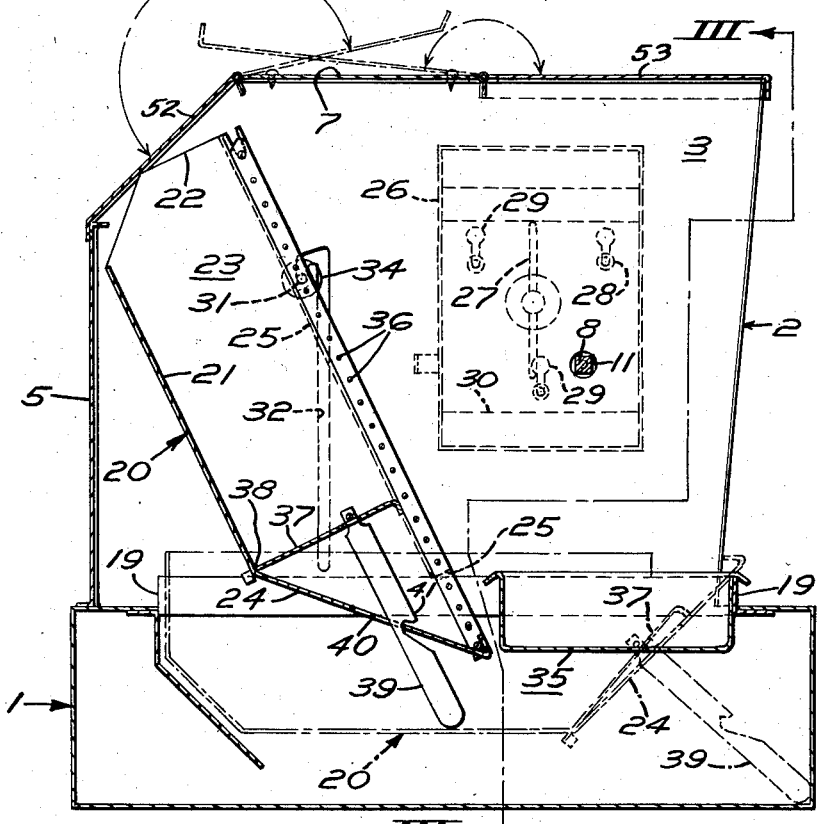
Fig. 2 is a transverse vertical sectional view taken about on line 2—2 of Fig. 3.

Referring more particularly to the accompanying drawing, the numeral 1 designates the base, 2 the housing or oven structure surmounting the same having side walls 3 and 4 and a back wall 5, all with base flanges 6 welded or otherwise secured to the base, and a top wall 7 rigidly bracing the side walls to form a roasting oven with an open front. Across this open front extends a spit having a shaft 8 with a pointed end 9 and an adjacent journal portion 10, Fig. 6, for turning support if desired. The shaft projects through an opening 11 in the end wall 3. The opposite end of the spit shaft 8 has a handle 12 and an adjacent journal portion 13 which latter is rotatably supported in a bearing 14, in end wall 4, to and from which it is removably accessible through slot 15. Opposing sets of roast impaling prongs 16, having mounting hubs 17, are adjustably fixed along the spit shaft by set screws 18.

The base 1 is provided with a well defined by an upright marginal rim 19 for receiving a fire basket or pot 20 that has a bottom 21, a rear opening 22, side walls 23, and an outwardly and upwardly inclined front wall 24. The fire basket is adapted to lie in a horizontal position to function as a grill and for this purpose it has outstanding lateral flanges 25 that rest upon the rim 19. In this position, the fire basket underlies the spit, the latter being slowly rotated by suitable means, such as a spring motor 26 which is more desirable for picnicking. The motor has a winding stem 27 and a driven socket to interlockingly receive the pointed end 9 of the spit shaft. The motor unit is made demountable from the housing by having headed studs 28 engaging in keyhole slots 29 of bracket 30 on the side wall 3.

Figure 1:
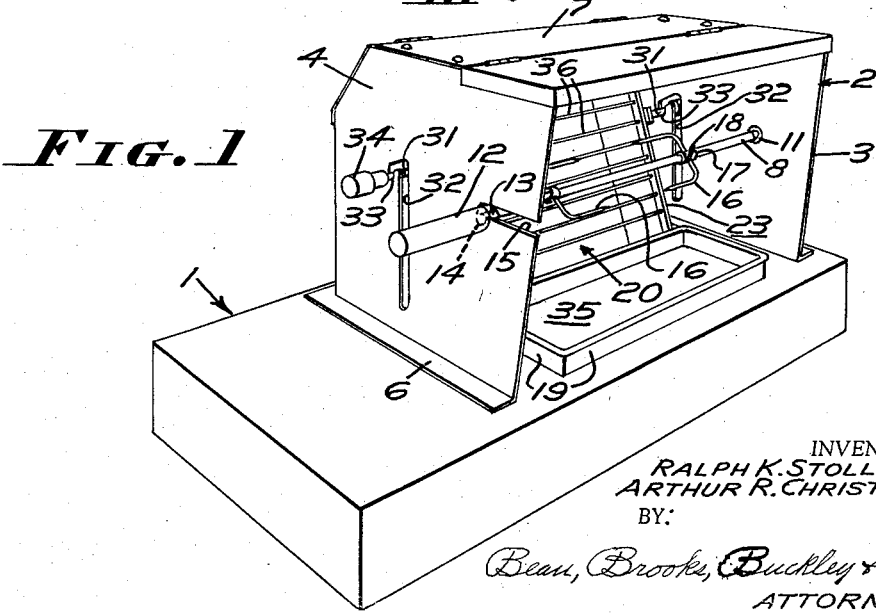
Fig. 1 is a perspective view of a convertible unit embodying the present invention.

For use as a rotisserie, the fire basket is tiltably offset from beneath the spit and this is accomplished by providing laterally directed trunnions 31 on the sides of the basket and engaging them in vertical slots or guideways 32 in the housing walls 3 and 4. The upper ends of the guideways terminate in offset seats 33 to receive the trunnions 31, the latter being equipped with handles 34 for this purpose. By grasping the handles and lifting the rear of the basket, the forward ends of the basket flanges 25 will ride inwardly along the opposite sides of the rim 19 and rest thereon while the trunnions remain engaged in the seats 33. This arrangement suspends the fire basket in the open front oven or roasting compartment of the housing, as seen best in Figs. 1 and 2. This disposition leaves the basket-receiving well open at its forward end where a pan 35 may be fitted to catch drippings of fat and sauce from the revolving roast carried by the spit. A grating 36 retains the loose bed of coals in the basket, and in order to hold the bed compact when tilted, the fire basket has an inner front wall 37 which may be adjusted inwardly to compact the bed, as depicted in Fig. 2. This bed-compacting wall is hinged at 38 to the bottom 21 of the basket but when the latter is horizontally disposed the wall will recline upon the upwardly and outwardly inclined front wall 24. A prop 39 supports the wall 37 operative and is pivotally connected at one end thereto while having its opposite end idling in a slot 40 in the front wall 24 when inoperative. For retaining the bed-compacting wall operative the prop is formed with a tooth 41 to interlock with the edge of the slot 40. In the horizontal position of the fire basket the prop 39 is disengaged to permit the wall 37 folding downwardly to close the slot 40, as shown in the broken lines in Fig. 2 so that when the basket is horizontally disposed the bed of coals may be spread out over the wall 24 to broaden the expanse of the field of heat beneath the spit.

Referring to the modification shown in Figs. 4, 5 and 6, the spit is provided with the impaling prongs 16 mounted on the hubs 17' that are frictionally held by springs 42 arranged to have braking contact with the spit shaft 8 thereby enabling easier adjustment of the prongs in contrast to the use of the set screws 18. The hubs 17' also carry skewer plates or disks 43, 44, the disk 43 having skewer receiving openings or seats 45 for receiving the pointed ends 46 of the skewers 47. The opposite ends of the skewers are formed with return bends to provide handles 48 and spring latch extensions 49 for interlocking with the margins of T-shaped seats or openings 50 formed in and opening through the periphery of the disk 44. By grasping and compressing the handle to bring the spring latch part 49 against the skewer body 47 the latch and skewer may be entered radially into the T-shaped seats 50 to interlock the latch with the margin of the seat by reason of the notch 51.

This detachably interlocks each skewer to the disks 43, 44 and holds it against free rotation in the seats. Each skewer is also formed from metal stock of non-circular cross section. Herein it is made of strip stock, such as stainless steel, so that when the pointed end 46 is thrust through a cabob and propertly positioned over the firebed between the disks 43, 44 the food will be held against free rotation on the skewer as the spit is slowly rotated above the source of heat. This insures the food being thoroughly roasted on all sides. The disks 43, 44 serve as walls to confine the heat on the interposed food portions undergoing the cooking process. With the firebed arranged in its tilted position any drippings of fat or sauce, which may be applied during the roasting broiling action, will fall into the pan 35. The skewers may carry individual portions for being served by merely removing each skewer from the spit. The modified spit with its removable skewers or sections is useable with the fire basket in either position. The conversion of the cooking apparatus for functioning as a rotisserie or a grill is readily accomplished by simply manipulating the basket handles 34. From the position shown in Fig. 1 where the apparatus serves as a rotisserie, the handles 34 are lifted to disengage the trunnions 31 from their seats 33 and then lowered into the guideways 32 after first removing the drip pan 35 from the well in the base. As the trunnnion slides downwardly in the guideways the forward ends of the lateral flanges 25 slide forwardly upon the rim 19 until the basket is formally lowered into the well. Thereafter the prop 39 is disengaged from the wall 37 for folding downwardly thereon to permit spreading of the coals toward the forward end of the basket.

The grating 36 may be made removable and held in place at its lower end by interlocking beneath a body flange 24' and at its upper end by interlocking in seats 23', Fig. 2. For refueling the fire basket, which term is used broadly to include a receptacle of suitable construction, a door 52 is provided. A second door 53 in the top of the housing may be opened for grilling but closed for barbecuing to retain the heat about the spit.

The convertible cooking arrangement is ideal for outdoor use, being powered by a spring motor although for home use an electric motor may be utilized. The skewer carrying plates 43, 44 act as heat-confining walls at opposite sides of the roasting food portions. The skewers constitute food impaling means and therefore may replace the impaling prongs 16, if desired, or used in combination therewith to support food portions within the encircling series of skewers having other food thereon.

The foregoing description has been given in detail without thought of limitation since the inventive concept and teaching of the present disclosure is applicable to other physical embodiments without departing from the spirit of the invention and the scope of the appended claim.

What is claimed is:

A convertible grill comprising a base and top, back, and a pair of opposing end walls upstanding therefrom forming an open front roasting chamber, the pair of end walls having opposed vertical guides, a fire basket having lateral trunnions slidably engaged in the guides, the forward edge portion of the basket riding forwardly and backwardly upon the base, said trunnions being disposed in the lower ends of the guides when the fire basket is substantially in a horizontal position and in the upper ends of the guides to support the fire basket in a tilted position, and a spit journaled in the end walls at a position common to both positions of the fire basket for either rotisserie or grill use.

References Cited in the file of this patent

UNITED STATES PATENTS

| | | |
|---|---|---|
| 2,441,190 | Fuller | May 11, 1948 |
| 2,638,888 | Molla | May 19, 1953 |
| 2,762,293 | Boyajian | Sept. 11, 1956 |

FOREIGN PATENTS

| | | |
|---|---|---|
| 634,762 | France | Feb. 25, 1928 |
| 845,826 | France | Sept. 4, 1939 |